United States Patent [19]
Grant

[11] Patent Number: 4,462,461
[45] Date of Patent: Jul. 31, 1984

[54] THERMAL MANAGEMENT SYSTEM AND APPARATUS

[76] Inventor: Hendrie J. Grant, 881 Lincoln Ave., St. Paul, Minn. 55105

[21] Appl. No.: 376,536

[22] Filed: May 10, 1982

[51] Int. Cl.³ .............................................. F28F 27/02
[52] U.S. Cl. ...................................... 165/26; 165/27; 165/43; 165/48 R; 165/101
[58] Field of Search ................ 165/42, 43, 48 R, 101, 165/18, 39, 40, 26, 27, 30, 34, 35, 36

[56] References Cited

U.S. PATENT DOCUMENTS

| | | | |
|---|---|---|---|
| 2,677,243 | 5/1954 | Telkes | 165/48 X |
| 2,753,157 | 7/1956 | Hoyer | 165/48 X |
| 3,180,403 | 4/1965 | Breen | 165/42 X |
| 4,230,174 | 10/1980 | Eubank | 165/42 X |

FOREIGN PATENT DOCUMENTS

| | | | |
|---|---|---|---|
| 2050898 | 4/1972 | Fed. Rep. of Germany | 165/42 |
| 905271 | 9/1962 | United Kingdom | 165/48 |

*Primary Examiner*—Sheldon J. Richter
*Attorney, Agent, or Firm*—Orrin M. Haugen; Thomas J. Nikolai; Douglas L. Tschida

[57] ABSTRACT

A thermal management system for a space of which the temperature is to be controlled, comprising apparatus to provide a path for circulation of cooling air to the space, apparatus to provide a path for circulation of warming air to the space, and apparatus operable to induce circulation of air in either of the paths and simultaneously prevent gravity circulation of air in the other air.

3 Claims, 4 Drawing Figures

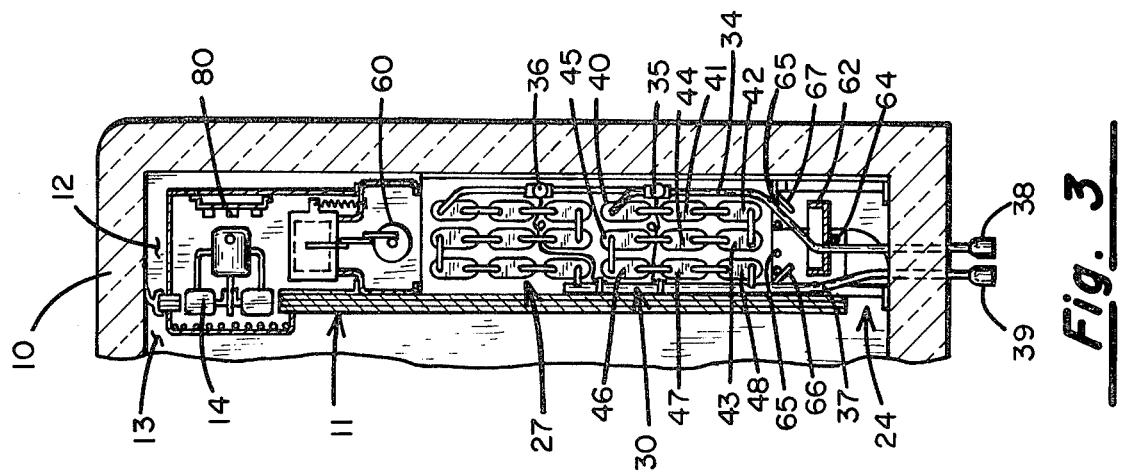
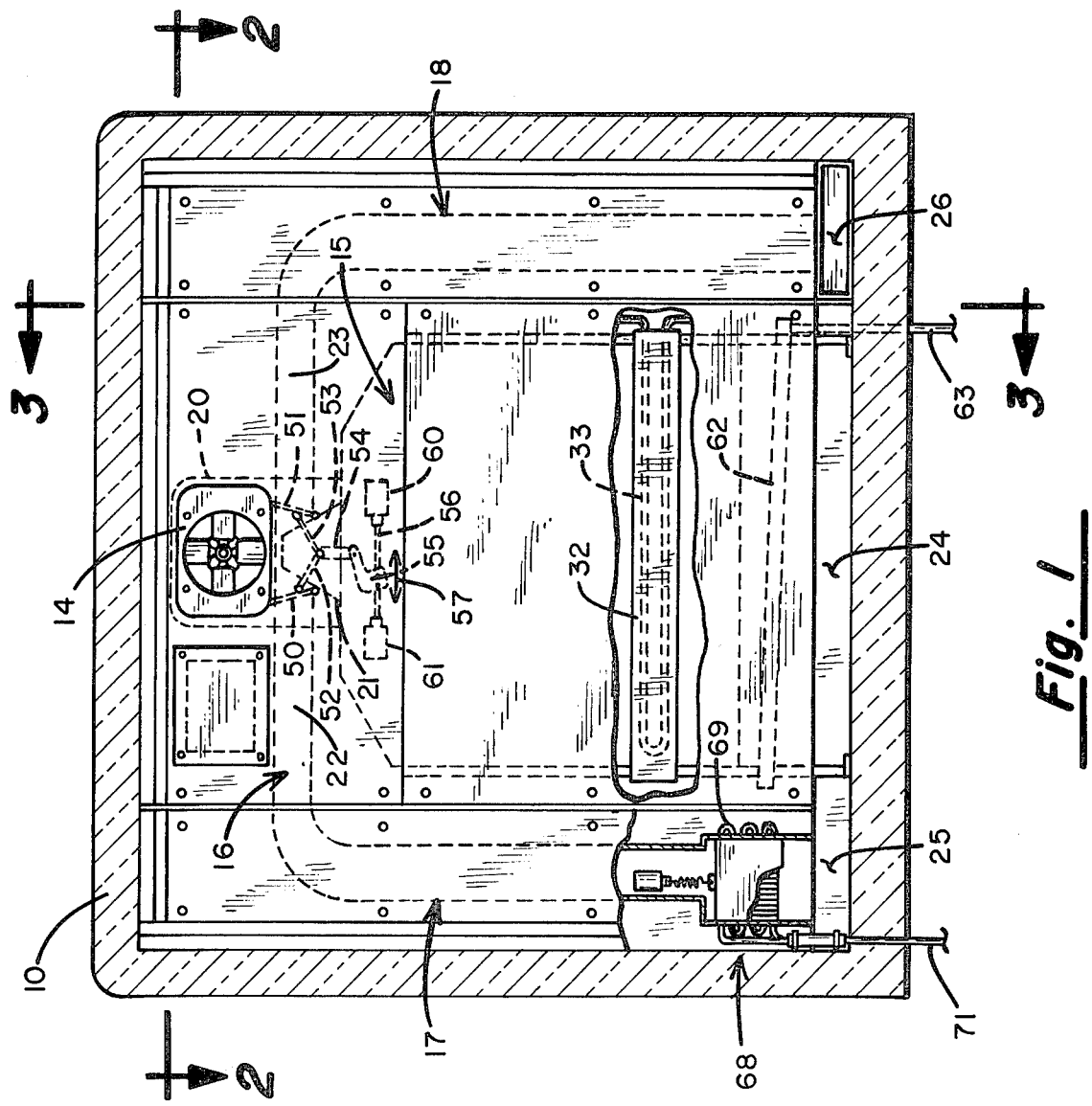
Fig. 3
Fig. 1

THERMAL MANAGEMENT SYSTEM AND APPARATUS

TECHNICAL FIELD

This invention relates to the field of thermal management, and more specifically to apparatus for efficiently managing the temperature within a movable chamber, such as a delivery van, which is subject to ambient temperatures which may be above or below the temperature within the van.

BACKGROUND OF THE INVENTION

In present day commerce, many materials are transported in over-the-road vehicles such as vans and trucks. It frequently is the case that materials transported must be prevented from varying in temperature as the temperature ambient to the vehicle varies. Many materials such as foodstuffs may not be allowed to become too warm in summer, while others must not be allowed to freeze in winter transport. It is advantageous to provide vehicles with apparatus to supply either heating or cooling, in accordance with seasonal demands, so that the same vehicles can be used year round.

It is, of course, known to make the walls of such vehicles of thermally insulative materials, but it is unavoidable to have the vehicle doors open for appreciable intervals during a delivery schedule, so that means for the addition or removal of heat must be made a part of the vehicle.

SUMMARY OF THE INVENTION

The present invention comprises an arrangement and an apparatus for managing the heating and coolng of a vehicle chamber so that the cooling may be done overnight, when the vehicle is not in use, using refrigeration apparatus in operation on off-peak rates, by extracting heat from eutectic coolers in the vehicle of sufficient capacity to overcome the heat entering the space during its daytime delivery schedule, and so that when desired heating may be accomplished primarily by thermally efficient means such as heaters taking their energy from the waste heat of the vehicle engine.

Various advantages and features of novelty which characterize the invention are pointed out with particularity in the claims annexed hereto and forming a part thereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views, FIG. 1 is a somewhat schematic showing looking forwardly in a van equipped with the present invention;

FIG. 3 is a fragmentary view partially in longitudinal vertical section along the line 3—3 of FIG. 1.

DESCRIPTION OF THE PREFERRED EMBODIMENT

Figure 2:
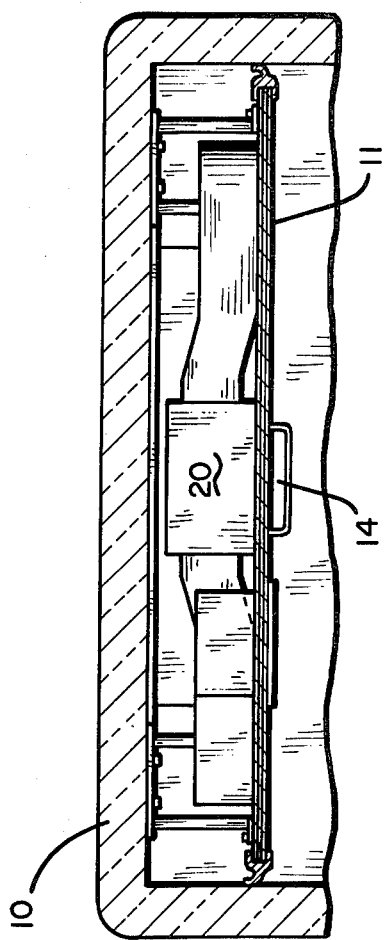
FIG. 2 is a fragmentary plan view partly in section along the line 2—2 of FIG. 1.
Figure 4:
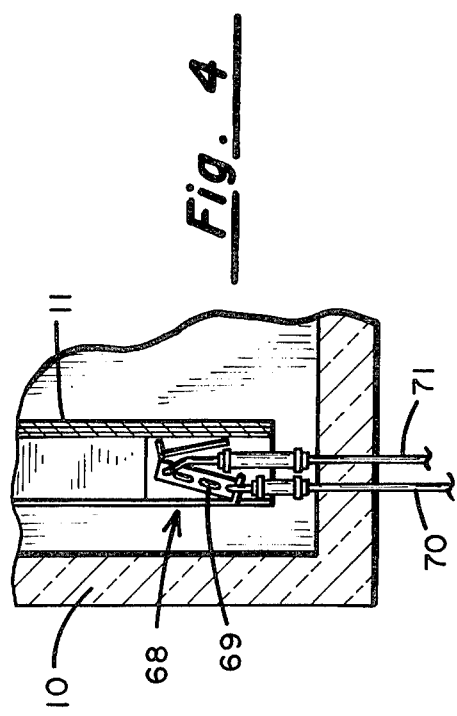
FIG. 4 is a fragmentary detail view.

In the drawing, the thermally insulating wall of a vehicle is shown at 10. A bulkhead 11 divides the interior of the vehicle into a small heat exchange compartment 12, toward the front, and a large storage compartment 13, toward the rear, into which the loading doors, not shown, of the vehicle open in conventional fashion. A circulation fan 14 at the top of bulkhead 11 at its center causes flow of air from compartment 12 to compartment 13.

Compartment 12 is divided by suitable ductwork into a central cooling section 15, a peripheral heating section 16 in two parts 17 and 18, and an outlet section 20 to which the cooling section is connected at a tapering duct 21 and to which the heating section portions are connected at ducts 22 and 23. Cooling section 15 is in communication with chamber 13 through a lower aperture 24, and portions 16 and 17 communicate with chamber 13 through lower apertures 25 and 26.

Cooling section 15 includes a pair of evaporative coolers 27 and 30. Each cooler is shown to comprise an assembly of nine identical evaporators, and each evaporator comprises a casing 32 containing a eutectic material and a refrigerant coil 33. The coils are connected to an inlet header 34 through a pair of expansion valves 35 and 36, and to a return header 37. Headers 34 and 37 are connected to a compressor-condensor unit, not shown, carried by the vehicle and arranged for driving by an electric motor suitable for connection to electric power mains. For some uses it may be desirable to provide headers 34 and 37 with self-sealing connectors 38 and 39 for releasable interconnection with a central refrigeration plant. Coils 33 are interconnected serially by a plurality of "U" bends, so that the refrigerant path for cooler 30, for example, may be traced through header 34, valve 35, evaporators 40, 41, 42, 43, 44, 45, 46, 47, and 48 to header 37.

A pair of shutters 50 and 51 are pivoted at the top of section 15 for movement between a first position shown, in which they close ducts 22 and 23 and open duct 21 to outlet section 20, and a second position, in which they close duct 31 and open ducts 22 and 23 to outlet section 20.

Shutters 50 and 51 are connected by individual links 52 and 53, a common link 54, and a bell crank 55 to a drive rod 56 actuable as indicated by arrow 57 by a pair of solenoids 60 and 61 located in the top of cooling section 15.

A sloping drip pan 62 is provided under coils 30, and has a drain 63. Conventional defrost heating means for the drip pan and the coils are suggested at 64 and 65, and drip baffles 66 and 67 direct the resulting water to pan 62.

In FIG. 1 a hot water heat exchanger 68 is shown as interposed between aperture 25 and duct 22, and includes a coil 69 to be interconnected by conduits 70 and 71 with the engine of the vehicle, so that the water heated in cooling the engine may circulate in coils 69. If anticipated weather conditions indicate it to be desirable, a second heater may be interposed between aperture 26 and duct 23.

An alternative mode of heating is shown to comprise electric heaters 80 mounted in outlet section 20 and preferrably energized by connection to the electric power mains. While not as fuel efficient as the hot water heater, such an arrangement may be desirable under some conditions to supply initial heat until the engine heat becomes available, or to supply needed additional heat while the vehicle is stationary at suitable locations.

OPERATION

The use of the invention will now be explained, assuming as an example that the vehicle is to be used for delivering foodstuffs, which must be kept cool in summer and prevented from freezing in winter. The composition of the eutectic material, ordinarily a solution in water of sodium or calcium chloride, is selected to have a freezing point which is less than the intended temperature within the vehicle by a pre-determined amount.

The vehicle is garaged overnight in a building having power means to which the motor of the vehicle compressor may be connected, or there may be a refrigeration plant in which connections 38 and 39 may be coupled. In either case the power for coolng the eutectic material surrounding the coil to its freezing point, is drawn during an interval of off-peak power rates.

Preferably fan 14 is also energized at this time, and shutters 50 and 51 are actuated to the position shown, to circulate the air over the coolers. The temperature in the vehicle and the coolers falls to the freezing point of the eutectic material, and remains there until the liquid is entirely frozen: further cooling would then lower the temperature further, if this were desired.

It may be advantageous to load material to be transported into the vehicle during this time, so that the heat entering the vehicle through the open doors may be disposed of by the main refrigeration system. After the desired temperature has been achieved, the vehicle may be disconnected from the power means or the central refrigeration system.

As the vehicle proceeds on its delivery schedule, some heat leaks into the storage compartment through walls 10: at each delivery stop the doors must stand open for a certain interval, and warm ambient air enters to replace the cool air. The air in the vehicle is circulated over coolers 27 and 30, air being drawn in from the bottom of the storage compartment at aperture 24, passing over the coils, through duct 21, and past fan 14 to the top of the storage compartment. Heat is transferred from the air to the eutectic material: this does not raise the temperature of the material, but begins to melt it. A sufficient mass of material is provided so that the heat entering the vehicle during its delivery route is not sufficient to thaw it all, and accordingly, the temperature in the vehicle remains constant.

If delivery is being made on an autumn day, for example, and the ambient temperature should drop below that desired within the vehicle, solenoids 60 and 61 are energized to actuate shutters 50 and 51 to their second position. This cuts off duct 21 from outlet section 20 and connects the outlet section to ducts 22 and 23. Liquid from the engine cooling system of the vehicle is circulated to heater 68. Fan 14 now draws air from aperture 25 over heater 68, through duct 22, and outlet section 20, and into the top of the storage compartment, to prevent that compartment from becoming too cold. If desired the liquid flow to heater 68 may be controlled by a thermostat in the storage compartment.

If the vehicle is to be used in the winter, it may be unnecessary to provide energy to cool the coolers. It may even be desirable to connect heaters 80 to the utility supply at the garage to maintain the temperature in the storage compartment at a desired minimum value, until engine operation begins and useful heat is available at heater 68.

It is to be particularly noted that the action of shutters 50 and 51 prevents any gravity flow of air in either the cooling section or the heating section when there is induced air circulation in the other section. This prevents either of the hot water heater and the eutectic coolers from becoming an inadvertent heating load on the other.

From the above, it will be evident that the invention comprises a thermal management apparatus primarily useful in vehicles for transportation of goods sensitive to temperature, which apparatus makes effective use of energy to draw its cooling energy at off-peak rates and store it for later use, and by inducing air circulation over the goods so that the desired temperature is maintained while gravity flow is prevented from causing any inadvertent heat load.

Numerous characteristics and advantages of the invention have been set forth in the foregoing description, together with the details of the structure and function of the invention, and the novel features thereof are pointed out in the appended claims. The disclosure, however, is illustrative only, and changes may be made in detail, especially in matters of shape, size, and arrangement of parts, within the principle of the invention, to the fully extent indicated by the broad general meaning of the terms in which the appended claims are expressed.

I claim:

1. Apparatus for controlling the temperature within a vehicular storage chamber comprising, in combination:
    (a) a normally closed vehicular storage chamber having a vertical bulkhead dividing said chamber into a relatively large storage compartment and a comparatively smaller heat exchange compartment, said heat exchange compartment being subdivided into a cooling section mounted between adjacent first and second heating sections;
    (b) at least one air inlet connection positioned at the bottom of each of said first and second heating and said cooling sections and communicating with the bottom of said storage compartment;
    (c) heating means mounted in at least one of said first and second heating sections and coupled in fluid flow communication with the heated engine coolant of a vehicle supporting said storage chamber for extracting heat therefrom;
    (d) refreezable cooling means including an eutectic material of sufficient mass having a freezing point below that of an intended storage temperature and mounted in said cooling section for being refrozen during non-use, off-peak times and maintaining said storage temperature as said eutectic material thaws during use;
    (e) a fan for discharging air into the top of said storage compartment;
    (f) separate ducts coupled to the tops of said first and second heating and said cooling sections and to said fan for supplying air to said storage compartment;
    (g) shutter means in said ducts having a first condition in which the ducts to said fan from said first and second heating sections is open and the duct to said fan from said cooling section is closed to prevent gravity flow of air in said cooling section and enable circulation of air between said storage compartment and said first and second heating sections, and having a second condition in which the duct to said fan from said cooling section is open and the ducts to said fan from said first and second heating sections is closed to enable forced circulation of air between said storage compartment and said cooling section and disable the flow of air from said storage compartment through said first and second heating sections; and (h) means responsive to the temperature of said storage compartment for controlling which of said ducts are open and closed and thereby maintaining a relatively constant ambient intended temperature in said storage compartment.

2. Apparatus as set forth in claim 1 wherein one of said first and second heating sections includes resistive heating elements.

3. Apparatus as set forth in claim 1 wherein said shutter means comprises a plurality of shutters each separately engageable with one of said ducts and coupled together via a respective plurality of links at a bell crank and a drive rod, said drive rod operatively coupled to said control means for controlling which of said ducts is open and which is closed.

* * * * *